United States Patent [19]

Plen

[11] 4,109,465
[45] Aug. 29, 1978

[54] WIND ENERGY ACCUMULATOR

[76] Inventor: Abraham Plen, 12 Ussishkin St., Tel Aviv, Israel

[21] Appl. No.: 806,264

[22] Filed: Jun. 13, 1977

[51] Int. Cl.² .......................... F15B 1/02; F15B 13/09
[52] U.S. Cl. ...................................... 60/398; 60/412; 92/36; 416/9; 417/334
[58] Field of Search ............... 60/398, 412, 413, 407, 60/325, 506; 92/36, 37, 50, 89; 290/44, 55; 416/9; 417/332, 334

[56] References Cited

U.S. PATENT DOCUMENTS

| 646,318 | 3/1900 | Ryder | 60/325 |
|---|---|---|---|
| 2,112,633 | 3/1938 | Moon | 290/55 X |
| 3,353,787 | 11/1967 | Semo | 60/325 |

*Primary Examiner*—Edgar W. Geoghegan
*Attorney, Agent, or Firm*—Browdy and Neimark

[57] ABSTRACT

A device is proposed which accumulates and stores energy of blowing wind.

Rotatable means turn the device into the direction of the blowing wind, so that articulated flaps are fully exposed to the wind. These flaps are connected with air pumping means which delivers a quantity of air into a storage container, the air being successively compressed within the container.

6 Claims, 3 Drawing Figures

U.S. Patent   Aug. 29, 1978   4,109,465
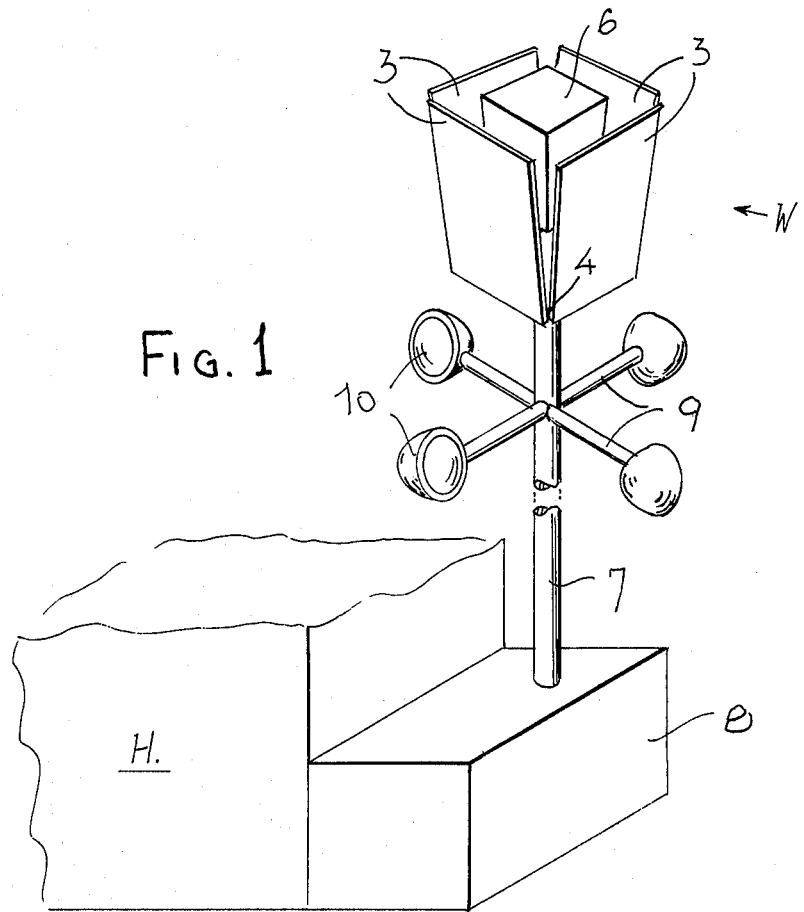
Fig. 1
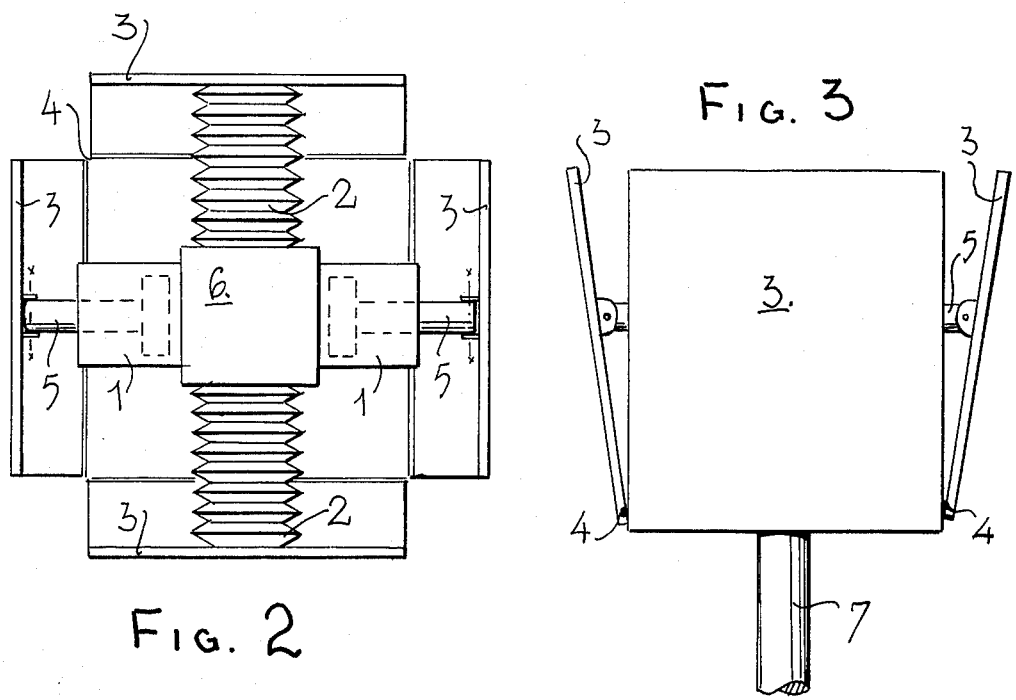
Fig. 2
Fig. 3

WIND ENERGY ACCUMULATOR

BACKGROUND OF INVENTION

The present invention relates to a device which accumulates and stores energy derived from blowing wind. It is the object of the invention to provide a device which can accumulate energy — in the form of pressurized air — derived from blowing winds.

SHORT SUMMARY OF DISCLOSURE

According to the invention there is provided an accumulator device storing wind energy comprising one or more articulated flaps adapted to be turned into the wind, an air pumping device actuated by the said flap whenever the latter faces the direction from which wind blows and a container into which the air is pumped, the said air pumping device being connected by a conduit with said container, the assembly of above elements being rotatively held, means being provided to cause the accumulator device to turn with the wind blowing.

SHORT DESCRIPTION OF ACCOMPANYING DRAWINGS

The invention will now be described with reference to the annexed drawing which shows in a schematical manner a device according to the invention. In the drawing FIG. 1 is a schematical view of the new device while
FIG. 2 is a plan view thereof.
FIG. 3 is an elevational view of the device.

DESCRIPTION OF PREFERRED EMBODIMENT

The device can be provided in the vicinity of or attached to a house which is indicated in the drawing by the letter H. The device comprises a number of piston in cylinder pumps indicated in the drawing by the numeral 1. The device may further comprise a number of bellows indicated by the numeral 2. The assembly of pumps 1 and bellows 2 is surrounded by flaps 3 which turn about horizontal hinges 4 and which apply themselves to the piston rods 5 of pumps 1 or to the rear end of the bellows 2. In fact the piston rods 5 may be attached to the flaps 3. From the cylinders of pumps 1 and from the bellows 2 lead passages into a central chamber 6 from which a conduit 7 leads into a container 8 for pressurized air.

The new device further comprises a spider 9 at the ends of which are provided impellers or sails 10. The conduit 7 which carries the whole device is rotatable in bearings (not shown) provided in the top of container 8. The spider 9 is fixedly attached to the rotatable carrying conduit 7.

The new device functions as follows: supposing that wind blows from the right hand side of FIG. 1 in the direction of the arrow W, the wind will impinge on one of the sails or impellers 10 and will slowly turn the whole device until one of the flaps is fully in the direction of the oncoming wind. This will cause the flap to be pressed inwardly and the respective pump or bellow will deliver a quantity of air into the chamber 6 and the conduit 7. This operation goes on indefinitely, the wind slowly turning the device and bringing flap after flap into the path of the wind thus successively working the pumps and bellows. The air is pressed into the container 8 and pressurized air and the energy stored therein can be used for whatever purpose, say feeding a wind motor or actuating whatever devices which are driven by pressurized air. Certain variations would be within the scope of the invention, so for instance it would be possible to use only air pumps or only bellows and there need not be four as shown but there might be less or more of these devices. Equally, the impellers or sails need not be carried on a spider, they might be affixed to the conduit 7 or otherwise.

What I claim is:

1. An accumulator storing wind energy comprising at least one air pumping device, at least one hinged flap adapted to be turned into the wind, the said air pumping device being actuated by the said flap whenever the latter faces the direction from which wind blows and a container into which the air is pumped, the said air pumping device being connected by a conduit with said container, the whole assembly of above elements being rotatively held, means being provided to cause the assembly constituting the accumulator device to turn with the wind blowing.

2. The accumulator claimed in claim 1, characterised thereby that the said pumping device is a bellows.

3. The accumulator claimed in claim 1 characterised thereby that the said pumping device is a piston-in-cylinder pump.

4. The accumulator claimed in claim 1 characterised thereby that the means for rotating the accumulator device and turning it into the wind is a spider the arms of which carry impellers exposed to the wind.

5. An accumulator device storing wind energy comprising four bellows, four hinged flaps adapted to be turned into the wind, each of the said four bellows being functionally connected to one of the said flaps, and thus of said bellows being actuated by its connected flap whenever the latter faces the direction from which wind blows, and a container into which the air is pumped, each of the said bellows delivering air into a container with which it is connected by a conduit, the whole assembly of above elements being rotatively held, means being provided to cause the assembly constituting the accumulator device to turn with the wind blowing.

6. An accumulator device storing wind energy comprising four piston-in-cylinder pumps, four hinged flaps adapted to be turned into the wind, each of the said four pumps being functionally connected to one of the said flaps, and thus each pump being actuated by its connected flap whenever the latter faces the direction from which wind blows, and a container into which the air is pumped, each of said pumps delivering air into a container with which it is connected by a conduit, the whole assembly of above elements being rotatively held, means being provided to cause the assembly constituting the accumulator device to turn with the wind blowing.

* * * * *